United States Patent [19]

Wasserman et al.

[11] Patent Number: 5,672,669
[45] Date of Patent: Sep. 30, 1997

[54] SPRAY DRIED, FILLED METALLOCENE CATALYST COMPOSITION FOR USE IN POLYOLEFIN MANUFACTURE

[75] Inventors: Eric Paul Wasserman, Hopewell; Mark Wilton Smale, Bloomsbury; Timothy Roger Lynn, Hackettstown; Robert Converse Brady III, Morristown; Frederick John Karol, Belle Mead, all of N.J.

[73] Assignee: Union Carbide Chemicals & Plastics Technology Corporation, Danbury, Conn.

[21] Appl. No.: 478,909

[22] Filed: Jun. 7, 1995

Related U.S. Application Data

[60] Division of Ser. No. 197,922, Feb. 17, 1994, abandoned, which is a continuation-in-part of Ser. No. 173,626, Dec. 23, 1993, abandoned.

[51] Int. Cl.$^6$ .................................................. C08F 4/42
[52] U.S. Cl. .................. 526/170; 526/160; 526/348.2; 526/348.4; 526/348.5; 526/943; 502/152
[58] Field of Search .................................... 526/160, 170, 526/348.2, 348.4, 348.5, 943

[56] References Cited

U.S. PATENT DOCUMENTS

| | | | |
|---|---|---|---|
| 4,293,673 | 10/1981 | Hamer et al. | 526/88 |
| 4,376,062 | 3/1983 | Hamer et al. | 252/429 B |
| 4,564,647 | 1/1986 | Hayashi et al. | 523/211 |
| 4,663,299 | 5/1987 | Chadwick et al. | 502/9 |
| 4,923,833 | 5/1990 | Kioka et al. | 502/9 |
| 4,935,397 | 6/1990 | Chang | 502/117 |
| 4,937,217 | 6/1990 | Chang | 502/111 |
| 4,937,301 | 6/1990 | Chang | 526/128 |
| 5,057,475 | 10/1991 | Canich et al. | 502/104 |
| 5,238,892 | 8/1993 | Chang | 502/111 |
| 5,272,236 | 12/1993 | Lai et al. | 526/348.5 |
| 5,317,036 | 5/1994 | Brady, III et al. | 523/223 |

FOREIGN PATENT DOCUMENTS

| | | |
|---|---|---|
| 0118172A1 | 9/1984 | European Pat. Off. |
| 0216402A2 | 4/1987 | European Pat. Off. |
| 0279586A2 | 8/1988 | European Pat. Off. |
| WO9221705 | 12/1992 | WIPO |
| WO9308221 | 4/1993 | WIPO |

*Primary Examiner*—David W. Wu
*Attorney, Agent, or Firm*—S. H. Hegedus

[57] ABSTRACT

Metallocene-containing catalyst compositions that include inert filler, a method for their preparation, and a method for their use in production of polyolefins are disclosed and claimed. The catalyst compositions contain solid particles of a mixture comprising a) a metallocene catalyst; b) a cocatalyst capable of activating said metallocene catalyst; and c) particulate filler material having an average particle size of less than about 10 micrometers that is unreactive with the metallocene catalyst and the cocatalyst. They are prepared by spray drying a slurry of the constituents.

2 Claims, 1 Drawing Sheet

SPRAY DRIED, FILLED METALLOCENE CATALYST COMPOSITION FOR USE IN POLYOLEFIN MANUFACTURE

This application is a Division of prior U.S. application: Ser. No. 08/197,922 filed Feb. 17, 1994, now abandoned and/which is a continuation-in-part of application Ser. No. 08/173,626 filed Dec. 23, 1993, now abandoned.

FIELD

This application relates to catalyst compositions for manufacture of polyolefins, and more particularly, to spray dried, filled metallocene catalyst compositions.

BACKGROUND

Manufacture of polyolefins by monomer polymerization in a catalyzed gas phase process generally employs solid catalyst particles having defined morphology. Catalyst particle morphology in turn determines the morphology of the polymer particles as they grow around the catalyst particles.

Silica and other inert, inorganic materials have been used as supports for polyolefin catalysts, and have been used extensively for immobilizing metallocene-methylalumoxane catalysts. However, there are drawbacks to such simple, supported catalysts in that a) they are sometimes less active than the corresponding unsupported materials, and b) large particles (>25 micrometers) of silica may remain in the finished polymer, where they may lower the polymer clarity and degrade the appearance rating of films made from the polymer.

One approach to avoiding the difficulties of supported metallocene catalysts is shown in U.S. Pat. No. 4,923,833, which discloses a spray dried metallocene catalyst composition containing no support material. In this patent, prepolymerization of olefin polymer around the spray dried catalyst composition particles is employed to achieve morphology control in the polymer product. This, however, brings disadvantages in time, effort and cost.

Metallocene/aluminoxane catalyst compositions containing no support material suffer from an additional drawback when using the solution-injection method of introducing such catalysts into the gas phase employed in olefin polymerization. Careful control of the catalyst flow rate, gas velocities and other reaction parameters is required or the morphology of the polyolefin particles produced becomes unstable. This may be manifested in the appearance of unacceptably large quantities of fines or agglomerates, sheeting, or fouling of the reactor. Such instability can lead to premature termination of reactor operation.

Accordingly, it would be desirable to have solid, metallocene catalyst compositions of good integrity and uniform morphology, and which do not result in large, residual silica particles in the product, yet whose activity is acceptable. Such catalyst compositions are the subject of this application.

SUMMARY

It has now been found that spray dried metallocene-containing catalyst compositions that contain inert filler have good activity as well as good particle integrity and morphology. These catalyst compositions produce polymer particles having desirable sphericity and narrow particle size distributions.

The invention provides a catalyst composition comprising solid particles of a mixture comprising: a) a metallocene catalyst; b) a cocatalyst capable of activating the metallocene catalyst; and c) particulate filler material having an average particle size of less than about 10 micrometers that is unreactive with the metallocene catalyst and the cocatalyst.

The invention also provides a method of preparing a catalyst composition, comprising forming a suspension comprising: a) a metallocene catalyst; b) a cocatalyst capable of activating the metallocene catalyst; and c) particulate filler material having an average particle size of less than about 10 micrometers that is unreactive with the metallocene catalyst and the cocatalyst, in a diluent; and spray drying the suspension.

The invention further provides a process for producing ethylene homopolymers or copolymers, comprising: contacting ethylene and optionally a higher alpha-olefin monomer under polymerization conditions with a catalyst composition comprising solid particles of a mixture comprising: a) a metallocene catalyst; b) a cocatalyst capable of activating said metallocene catalyst; and c) a particulate filler material having an average particle size of less than about 10 micrometers that is unreactive with the metallocene catalyst and the cocatalyst, as well as polyethylene produced by this process.

DETAILED DESCRIPTION

Figure 1:
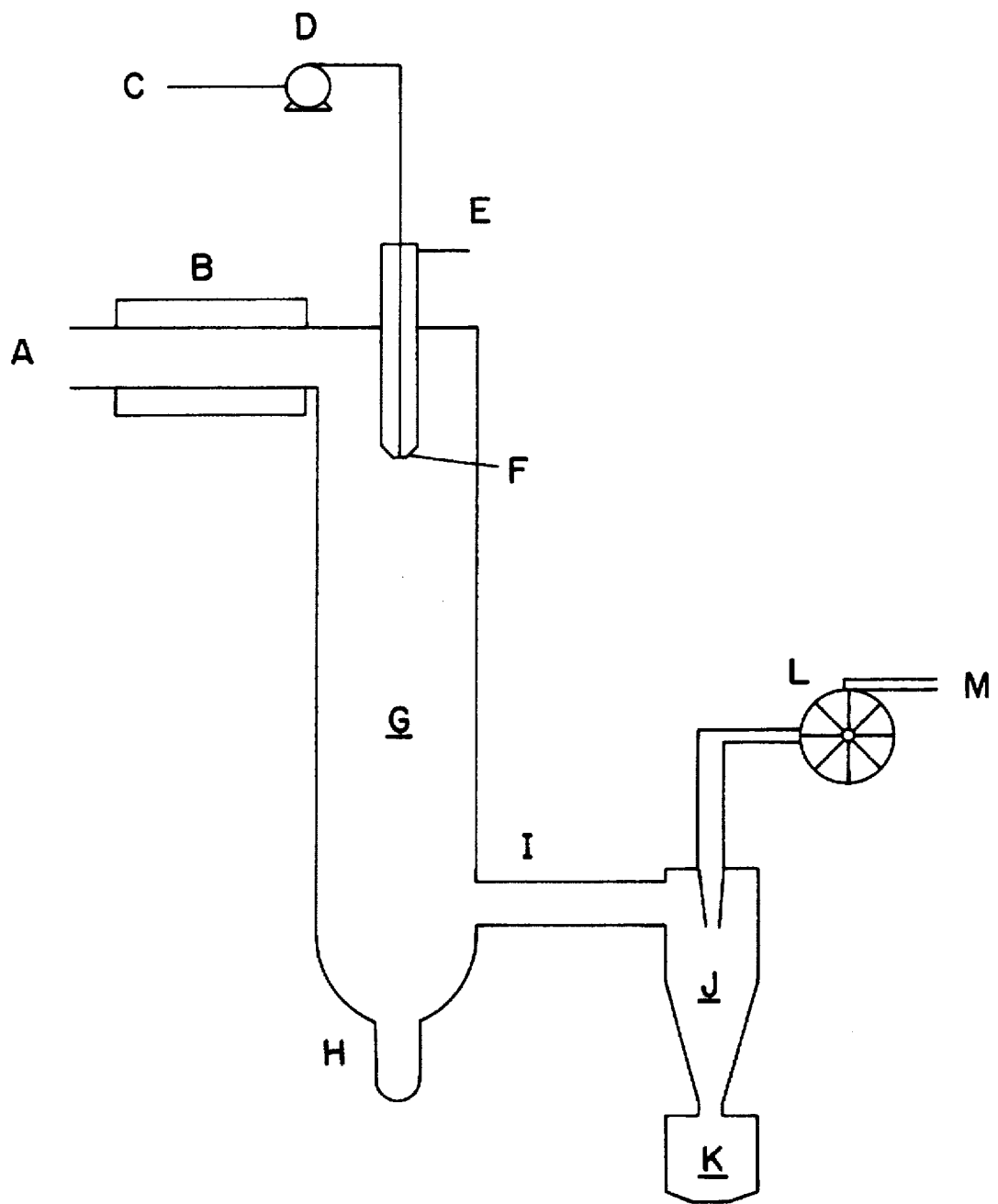
FIG. 1 is a schematic of a spray drying apparatus for making the spray dried, filled catalyst composition.

The catalyst composition comprises at least one metallocene catalyst, at least one cocatalyst, and particulate filler material having an average particle size of less than about 10 micrometers. The particulate filer material is unreactive with both the metallocene catalyst and the cocatalyst.

The metallocene catalyst is an organometallic coordination complex containing at least one π-bonded moiety in association with a metal atom from Groups IIIB to VIII, or the Lanthanide series of the Periodic Table. Particularly desirable are metallocene catalysts containing metals from Group IVB or VB of the Periodic Table, such as titanium, zirconium, hafnium and vanadium. Especially preferred are metallocene catalysts containing zirconium.

One useful class of metallocene catalysts are organometallic compounds containing at least one cyclopentadienyl group bonded to a Group IIIB to VIII metal, such as mono, di-, and tricyclopentadienyls and their derivatives of these transition metals.

A preferred metallocene catalyst containing at least one cyclopentadienyl group bonded to a Group IIIB to VIII metal has the formula:

$$(C_5R_n)_yR'_z(C_5R_m)MY_{(x-y-1)} \qquad (1)$$

wherein M is a metal from Groups IIIB to VIII of the Periodic Table; $(C_5R_n)$ and $(C_5R_m)$ are independently cyclopentadienyl or substituted cyclopentadienyl groups bonded to M; each R is independently hydrogen or a hydrocarbyl radical such as alkyl, alkenyl, aryl, alkylaryl, or arylalkyl radical containing from 1 to 20 carbon atoms, or two carbon atoms are joined together to form a $C_4$–$C_6$ ring; each R' is a $C_1$–$C_4$ substituted or unsubstituted alkylene radical, a dialkyl or diaryl germanium or silicon, or an alkyl or aryl phosphine or amine radical bridging two $(C_5R_n)$ and $(C_5R_m)$ figs; each Y is independently a hydrocarbyl radical such as aryl, alkyl, alkenyl, alkylaryl, or arylalkyl radical having from 1–20 carbon atoms, hydrocarboxy radical having from 1–20 carbon atoms, or halogen; n and m are each 0, 1, 2, 3, or 4; z is 0 or 1, and z is 0 when y is 0; y is 0, 1, or 2; x is 1, 2, 3, or 4 depending upon the valence state of M; and x-y ≧1.

Illustrative but non-limiting examples of metallocene catalysts of formula 1 are dialkyl metallocenes such as bis(cyclopentadienyl)titanium dimethyl, bis (cyclopentadienyl)titanium diphenyl, bis(cyclopentadienyl) zirconium dimethyl, bis(cyclopentadienyl)zirconium diphenyl, bis(cyclopentadienyl)hafnium dimethyl and diphenyl, bis(cyclopentadienyl)titanium di-neopentyl, bis (cyclopentadienyl)zirconium di-neopentyl, bis (cyclopentadienyl)titanium dibenzyl, bis(cyclopentadienyl) zirconium dibenzyl, bis(cyclopentadienyl)vanadium dimethyl; the mono alkyl metallocenes such as bis (cyclopentadienyl)titanium methyl chloride, bis (cyclopentadienyl)titanium ethyl chloride, bis (cyclopentadienyl)titanium phenyl chloride, bis (cyclopentadienyl)zirconium methyl chloride, bis (cyclopentadienyl)zirconium ethyl chloride, bis (cyclopentadienyl)zirconium phenyl chloride, bis (cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyls titanocenes such as, pentamethylcyclopentadienyl titanium trichloride, pentaethylcyclopentadienyl titanium trichloride; bis (pentamethylcyclopentadienyl)titanium diphenyl, the carbene represented by the formula bis(cyclopentadienyl) titanium=CH2 and derivatives of this reagent; substituted bis(cyclopentadienyl)titanium (IV) compounds such as: bis (indenyl)titanium diphenyl or dichloride, bis (methylcyclopentadienyl)titanium diphenyl or dihalides; dialkyl, trialkyl, tetra-alkyl and penta-alkyl cyclopentadienyl titanium compounds such as his(1,2-dimethylcyclopentadienyl)titanium diphenyl or dichloride, bis(1,2-diethylcyclopentadienyl)titanium diphenyl or dichloride; silicon, phosphine, amine or carbon bridged metallocene compounds such as isopropylidene (cyclopentadienyl)(fluorenyl)zirconium dichloride, isopropylidene(cyclopentadienyl)(octahydrofluorenyl) zirconium dichloride, diphenylmethylene(cyclopentadienyl) (fluorenyl)zirconium dichloride, diisopropylmethylene (cyclopentadienyl)(fluorenyl)zirconium dichloride, diisobutylmethylene(cyclopentadienyl)(fluorenyl)zirconium dichloride, ditertbutylmethylene(cyclopentadienyl) (fluorenyl)zirconium dichloride, cyclohexylidene (cyclopentadienyl)(fluorenyl)zirconium dichloride, diisopropylmethylene(2,5-dimethylcyclopentadienyl) (fluorenyl)zirconium dichloride, isopropylidene (cyclopentadienyl)(fluorenyl)hafnium dichloride, diphenylmethylene(cyclopentadienyl)(fluorenyl)hafnium dichloride, diisopropylmethylene(cyclopentadienyl) (fluorenyl)hafnium dichloride, diisobutylmethylene (cyclopentadienyl)(fluorenyl)hafnium dichloride, di-t-butylmethylene(cyclopentadienyl)(fluorenyl)hafnium dichloride, cyclohexylidene(cyclopentadienyl)(fluorenyl) hafnium dichloride, diisopropylmethylene(2,5-dimethylcyclopentadienyl) (fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, rac-ethylene bis(indenyl)zirconium dichloride, rac-ethylene bis(4,5,6,7-H-tetrahydroindenyl)zirconium dichloride, rac-dimethylsilylene bis(indenyl)zirconium dichloride, rac-dimethylsilylene bis(4,5,6,7-H-tetrahydroindenyl)zirconium dichloride, rac-1,1,2,2-tetramethylsilanylene bis(1-indenyl) zirconium dichloride, rac-1,1,2,2-tetramethylsilanylene bis (4,5,6,7-H-tetrahydro-1-indenyl)zirconium dichloride, ethylidene(1-indenyl)(tetramethylcyclopentadienyl) zirconium dichloride, rac-dimethylsilylene bis(2-methyl-4-t-butyl-1-cyclopentadienyl)zirconium dichloride, rac-ethylene bis(1-indenyl)hafnium dichloride, rac-ethylene bis (4,5,6,7-H-tetrahydro-1-indenyl)hafnium dichloride, rac-dimethylsilylene bis(1-indenyl)hafnium dichloride, rac-dimethylsilylene bis(4,5,6,7-H-tetrahydro-1-indenyl) hafnium dichloride, rac-1,1,2,2-tetramethylsilanylene bis(1-indenyl)hafnium dichloride, rac-1,1,2,2-tetramethylsilanylene bis(4,5,6,7-tetrahydro-1-indenyl) hafnium dichloride, ethylidene(1-indenyl-2,3,4,5-tetramethyl-1-cyclopentadienyl)hafnium dichloride, rac-ethylene bis(1-indenyl)titanium dichloride, rac-ethylene bis (4,5,6,7-H-tetrahydro-1-indenyl)titanium dichloride, rac-dimethylsilyl bis(1-indenyl) titanium dichloride, rac-dimethylsilyl bis(4,5,6,7-H-tetrahydro-1-indenyl)titanium dichloride, rac-1,1,2,2-tetramethylsilanylene bis(1-indenyl) titanium dichloride rac-1,1,2,2-tetramethylsilanylene bis(4, 5,6,7-H-tetrahydro-1-indenyl)titanium dichloride, rac-ethylene bis(indenyl)zirconium dimethyl, rac-ethylene bis (4,5,6,7-H-tetrahydroindenyl)zirconium dimethyl, rac-dimethylsilylene bis(indenyl)zirconium dimethyl, rac-dimethylsilylene bis(4,5,6,7-H-tetrahydroindenyl)zirconium dimethyl, isopropylidene(cyclopentadienyl)(fluorenyl) zirconium dimethyl, diphenylmethylene(cyclopentadienyl) (fluorenyl)zirconium dimethyl, rac-ethylene bis(2-methylindenyl)zirconium dichloride, rac-dimethylsilylene bis(2-methylindenyl)zirconium dichloride, rac-ethylene bis (2-methylindenyl)zirconium dimethyl, rac-dimethylsilylene bis(2-methylindenyl)zirconium dimethyl, dimethylsilylene bis(cyclopentadienyl)zirconium dichloride, and ethylidene (1-indenyl)(2,3,4,5-tetramethyl-1-cyclopentadienyl) titanium dichloride.

A more preferred metallocene catalyst containing at least one cyclopentadienyl group bonded to a Group IIIB to VIII metal is a bridged metallocene having the formula:

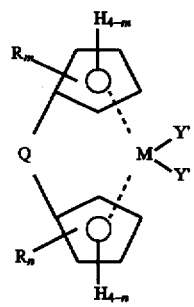

(2)

wherein:

Q is a bridging linkage selected from

R"₂C<, R"₂Si<, R"₂Ge<, and —C₂R"₄— wherein each R" moiety is independently H or an alkyl group, or two R" moieties are joined to form a ring structure.

Preferably, when an R" moiety is an alkyl group, it contains 3 to 8 carbon atoms, and when two R" moieties are joined to form a ring structure with the atom or atoms to which they are respectively attached, a 5 or 6-membered ring is formed. The subscripts m and n are each 0, 1, 2, 3, or 4, and the sum of m and n is preferably 2 to 6. The metal M is a Ti, Zr, or Hf atom, preferably Zr. Each Y' is independently H, an alkyl group, or a halogen atom.

In bridged metallocenes, the cyclic π-bonded moieties may bear one or more substituents R. Each R moiety is independently an alkyl, cycloalkyl, alkenyl, cycloalkenyl, phenyl, alkyl-substituted phenyl, or a phenyl-substituted alkyl group, or two adjacent R groups on a given ring are joined to form a second ring. Preferably, each R moiety is independently an alkyl or cycloalkyl group of 3 to 8 carbon atoms, an alkenyl group of 2 to 8 carbon atoms, a cycloalkenyl group of 5 to 8 carbon atoms, phenyl, an alkyl-substituted phenyl group in which the alkyl group contains 3 to 8 carbon atoms, a phenyl-substituted alkyl group in which the alkyl portion contains 1 to 4 carbon atoms, or two adjacent R groups on a given ring are joined and together with the carbon atoms to which they are respectively attached form a saturated or unsaturated 4, 5, or 6-membered ring.

The following compounds are illustrative but non-limiting examples of bridged metallocenes of formula (2) that may be used as the metallocene catalyst:

rac-ethylene bis(indenyl)zirconium dichloride;

rac-ethylene bis(4,5,6,7-H-tetrahydroindenyl)zirconium dichloride;

rac-dimethylsilylene bis(indenyl)zirconium dichloride;

rac-dimethylsilylene bis(4,5,6,7-H-tetrahydroindenyl) zirconium dichloride;

rac-ethylene bis(indenyl)zirconium dimethyl;

rac-ethylene bis(4,5,6,7-H-tetrahydroindenyl)zirconium dimethyl;

rac-dimethylsilylene bis(indenyl)zirconium dimethyl;

rac-dimethylsilylene bis(4,5,6,7-H -tetrahydroindenyl) zirconium dimethyl;

rac-ethylene bis(2-methylindenyl)zirconium dichloride;

rac-dimethylsilylene bis(2-methylindenyl)zirconium dichloride;

rac-ethylene bis(2-methylindenyl)zirconium dimethyl;

rac-dimethylsilylene bis(2-methylindenyl)zirconium dimethyl;

isopropylidene(cyclopentadienyl)(fluorenyl)zirconium dichloride;

diphenylmethylene(cyclopentadienyl)(fluorenyl) zirconium dichloride;

isopropylidene(cyclopentadienyl)(fluorenyl)zirconium dimethyl;

diphenylmethylene(cyclopentadienyl)(fluorenyl) zirconium dimethyl; and dimethylsilylbis(cyclopentadienyl)zirconium dichloride.

Bridged metallocenes may be made by one of several methods. For example, see A. Razavi and J. Ferrara, *J. Organomet. Chem.*, 435, 299 (1992) and K. P. Reddy and J. L. Petersen, *Organometallics*, 8, 2107 (1989). One method comprises first reacting two equivalents of an optionally substituted cyclopentadiene with a metallic deprotonating agent such as an alkyllithium or potassium hydride in an organic solvent such as tetrahydrofuran, followed by reaction of this solution with a solution of one equivalent of a doubly-halogenated compound such as dichlorodimethylsilane. The resulting ligand is then isolated by conventional methods known to those skilled in the art (such as distillation or liquid chromatography), reacted with two equivalents of a metallic deprotonating agent as above, and then reacted with one equivalent of a tetrachloride of a group IV(B) metal, optionally coordinated with donor ligand molecules such as tetrahydrofuran, in organic solvent. The resulting bridged metallocene is isolated by methods known to those skilled in the art such as recrystallization or sublimation.

Alternatively, bridged metallocenes may be produced by first reacting one equivalent of an optionally substituted cyclopentadiene with one equivalent of metallic deprotonating agent in an organic solvent as above, followed by reaction with one equivalent of a molecule containing an unsaturated five-carbon ring to which is attached an exocyclic group susceptible to nucleophilic attack, such as a dialkylfulvene. The reactive solution is next quenched with water and the ligand is isolated by conventional methods. One equivalent of the ligand is next reacted with two equivalents of metallic deprotonating agent as above and the resulting solution is in turn reacted with one equivalent of a tetrachloride of a group IV(B) metal optionally coordinated with donor ligand molecules such as tetrahydrofuran, in organic solvent. The resulting bridged metallocene is isolated by methods known to those skilled in the art.

Another class of useful metallocene catalysts are constrained geometry metallocenes as described in PCT Publication No. WO 93/08221. Constrained geometry metallocenes are coordination complexes comprising a metal atom of Groups IIIB to VIII, or the Lanthanide series and a delocalized π-bonded moiety substituted with a constrain-inducing moiety, said complex having a constrained geometry about the metal atom such that the angle at the metal atom between the centroid of the delocalized, substituted π-bonded moiety and the center of at least one remaining substituent is less than such angle in a similar complex containing a similar π-bonded moiety lacking in such constrain-inducing moiety, and provided further that for such complexes comprising more than one delocalized, substituted π-bonded moiety, only one thereof for each metal atom of the complex is a cyclic, delocalized, substituted π-bonded moiety.

Preferred constrained geometry metallocenes have the formula:

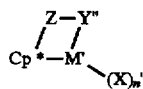

(3)

wherein M' is a metal of Groups IIIB-VIII or the Lanthanide series of the Periodic Table; Cp* is a cyclopentadienyl or substituted cyclopentadienyl group bound in an $\eta^5$ bonding mode to M'; Z is a moiety comprising boron or a member of Group IVa of the Periodic Table, and optionally sulfur or oxygen, said moiety having up to 20 non-hydrogen atoms, and optionally Cp* and Z together form a fused ring system; each X is independently an anionic ligand group or neutral Lewis base ligand group having up to 30 non-hydrogen atoms; n' is 1, 2, 3, or 4 and is 2 less than the valence of M'; and Y' is an anionic or nonionic ligand group bonded to Z and M' comprising nitrogen, phosphorus, oxygen, or sulfur and having up to 20 non-hydrogen atoms, optionally Y" and Z together form a fused ring system.

Examples of preferred constrained geometry metallocenes include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl- η⁵-cyclopentadienyl)-1,2-ethanediylzirconium dichloride, (methylamido)(tetramethyl-η⁵-cyclopentadienyl)-1,2-ethanediyltitanium dichloride, (ethylamido)(tetramethyl-η⁵-cyclopentadienyl)-methylenetitanium dichloro, (tertbutylamido)dibenzyl(tetramethyl-η⁵-cyclopentadienyl)-silanezirconium dibenzyl, (benzylamido)dimethyl-(tetramethyl-η⁵-cyclopentadienyl)silanetitanium dichloride, (phenylphosphido)dimethyl(tetramethyl-η⁵-cyclopentadienyl)silanezirconium dibenzyl, (tertbutylamido)dimethyl(tetramethyl-η⁵-cyclopentadienyl) silanetitanium dimethyl, and the like.

The cocatalyst is capable of activating the metallocene catalyst, and may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula [A⁺][BR*₄—], where A⁺ is a cationic Lewis or Bronsted acid capable of abstracting an alkyl, halogen, or hydrogen from the bridged metallocene catalyst, B is boron, and R* is a substituted aromatic hydrocarbon, preferably a perfluorophenyl radical; and (c) boron alkyls of the general formula BR*₃, where R* is as defined above.

Preferably, the cocatalyst is a branched or cyclic oligomeric poly(hydrocarbylaluminum oxide). More preferably, the cocatalyst is an aluminoxane such as methylaluminoxane (MAO) or modified methylaluminoxane (MMAO).

Aluminoxanes are well known in the art and comprise oligomeric linear alkyl aluminoxanes represented by the formula:

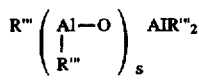

and oligomeric cyclic alkyl aluminoxanes of the formula:

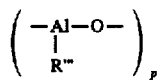

wherein s is 1–40, preferably 10–20; p is 3–40, preferably 3–20; and R''' is an alkyl group containing 1 to 12 carbon atoms, preferably methyl or an aryl radical such as a substituted or unsubstituted phenyl or naphthyl radical.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

The amount of metallocene catalyst and cocatalyst usefully employed in the catalyst composition may vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula [A⁺][BR*₄—] or a boron alkyl of the formula BR*₃, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The catalyst composition may optionally contain one or more second catalysts. These second catalysts include for example any Ziegler-Natta catalysts containing a metal from Groups IV(B), V(B), or VI(B) of the Periodic Table. Suitable activators for Ziegler-Natta catalysts are well known in the art and may also be included in the catalyst composition.

The filler material is selected from organic and inorganic compounds that are inert to the cocatalyst and the metallocene catalyst. Examples include alumina, titanium dioxide, polystyrene, rubber modified polystyrene, polyethylene, polypropylene, magnesium chloride, and silicon dioxide such as finned silica. Such fillers may be used individually or in combinations.

The flier material has an average particle size of less than about 10 micrometers, preferably less than about 1 micrometer, and most preferably has an average particle size in the range of about 0.001 to about 0.1 micrometers.

The catalyst composition is prepared by forming a well-stirred suspension of finely divided filler material, one or more metallocene catalysts and one or more cocatalysts in one or more suitable diluents, and then spray drying the suspension. Typically, in preparing the suspension, the filler material is added to a solution or dispersion of the cocatalyst to form a first suspension. The first suspension is stirred for approximately 20 to 60 minutes, and then a solution or dispersion of the metallocene catalyst is added thereto. The resulting final suspension is stirred for a further 20 to 60 minutes and then spray dried. The same or different diluents may be used for the metallocene catalyst and the cocatalyst.

Preferably, spray drying is performed by spraying the suspension through a heated nozzle into a stream of heated inert drying gas, such as nitrogen, argon, or propane to evaporate the diluent and produce solid-form particles of metallocene catalyst and cocatalyst in a matrix of filler material. The volumetric flow of the drying gas is preferably considerably larger than the volumetric flow of the suspension. Atomization of the suspension may be accomplished using an atomizing nozzle or a centrifugal high speed disc atomizer.

The diluent employed in forming the suspension is typically a material capable of dissolving or suspending the metallocene catalyst and the cocatalyst, and suspending the filler material. For example, hydrocarbons such as linear or branched alkanes including n-hexane, n-pentane and isopentane; aromatics such as toluene and xylene; and halogenated hydrocarbons such as dichloromethane are useful as the diluent. Preferably, for practical reasons the diluent has a boiling point from about 0°–150° C.

The amounts of metallocene catalyst and cocatalyst employed in the suspension of metallocene catalyst, cocatalyst and filler material are as follows. When the cocatalyst is a branched or cyclic oligomeric poly(hydrocarbylaluminum oxide), the mole ratio of aluminum atoms (from the cocatalyst) to transition metal (from the metallocene catalyst) in the suspension is between about 10 and about 5,000, preferably about 50 to about 1000, and most preferably about 100 to about 500. When the cocatalyst is an ionic salt of the formula $[A^+][BR^*_4{-}]$ or a boron alkyl of the formula $BR^*_3$, the mole ratio of boron atoms (from the cocatalyst) to transition metal (from the metallocene catalyst) in the suspension is between about 0.5 and about 10, preferably about 1 to about 5.

The amount of filler employed in forming the suspension is from about 1to about 80 percent by weight, preferably about 10 to about 60 percent by weight, and most preferably about 20 to about 50 percent by weight, based on the total weight of the catalyst composition.

The spray dried, filled catalyst composition may optionally contain an organic or inorganic compound as a binder so that particle integrity is further enhanced. The binder may also serve a second function, such as stabilizing the final polyolefin product against oxidation, or improving the gas phase fluidization of nascent polymer particles. Such compounds are well known in the art.

The spray dried, filled catalyst composition is a particulate material containing at least one cocatalyst and at least one metallocene catalyst in a matrix of at least one inert filler material. The particles of catalyst composition have an average particle size of 5 to 500, preferably 10 to 80, micrometers. The catalyst composition may be mixed with a suitable protective material such as mineral oil for storage.

The catalyst composition may be used in the polymerization of ethylene and optionally higher alpha-olefin monomers, i.e., having 3 to about 8 carbon atoms, into ethylene homopolymers and copolymers.

The polymerization process may be conducted in the gas phase in a stirred or fluidized bed reactor, or in a slurry phase reactor using equipment and procedures well known in the art. Ethylene monomer and optionally one or more higher alpha-olefin monomers are contacted with an effective mount of catalyst composition at a temperature and a pressure sufficient to initiate polymerization. The process may be carried out in a single reactor or in two or more reactors in series. The process is conducted substantially in the absence of catalyst poisons such as moisture, oxygen, carbon dioxide, and acetylene, since only minor amounts (i.e. <2 ppm) of such materials have been found to affect the polymerization adversely.

Conventional additives may be included in the process. When hydrogen is used as a chain transfer agent in the process, it is used in amounts varying between about 0.001 to about 10 moles of hydrogen per mole of ethylene plus comonomer. Also, as desired for temperature control of the system, any materials inert to the catalyst composition and reactants can also be present in the system.

Organometallic compounds may be employed as external cocatalysts in the polymerization process to scavenge for poisons and increase the catalyst activity. Often the same compounds useful as cocatalysts are also useful as external cocatalysts. Examples of useful external catalysts are metal alkyls, preferably aluminum alkyls, most preferably triisobutylaluminum. Use of such external cocatalysts is well known in the art.

The spray dried, filled catalyst composition has good activity in both fluidized bed reactors and slurry reactors. In particular, the activity of the spray dried, filled catalyst composition is comparable to that of both supported and unsupported (i.e., in solution) metallocene catalysts.

Moreover, polyethylene produced using the spray dried, filled catalyst composition has excellent morphology. It is believed this is because little fragmentation of the catalyst composition particles occurs prior to the onset of polymerization. When polymerization begins, polymer begins to grow around the catalyst composition particles and the morphology of the catalyst composition particles is replicated in the morphology of the polymer particles, polymer holding each growing particle together. Therefore, particles of polyethylene having a well defined and uniform morphology are produced. Accordingly, the spray dried, filled catalyst composition advantageously combines activites comparable to those of conventional metallocene catalyst compositions with the ability closely control the morphology of the polymer product.

EXAMPLES

Glossary

Activity was measured in kg(polymer)/mmolZr.h.MPa $(C_2H_4)$.

Cab-O-Sil® TS-610 is fumed silica, available from Cabot Corporation.

Davison® 955 silica is available from W.R. Grace & Company.

DCM is dichloromethane.

DPZ is diphenylmethylene(cyclopentadienyl)(fluorenyl)-zirconium dichloride.

FI is flow index, reported as grams per 10 minutes, determined in accordance with ASTM D-1238, condition F, and was measured at ten times the weight used in the melt index test.

ICP stands for inductively coupled plasma analysis, the technique by which the metal residues in the catalyst compositions were determined.

Irgafos® 168 is tris(2,4-di-tert-butylphenyl)phosphite, available from Ciba-Geigy Corporation.

Kaydol® is mineral oil, available from Witco Corporation.

MAO is methylalumoxane, 11 weight % in toluene, available from Ethyl Corporation.

MI is melt index, reported as grams per 10 minutes, determined in accordance with ASTM D-1238, condition E, at 190° C.

MMAO—H is modified methylalumoxane, 9 weight Al % in heptane, available from Akzo Corporation (type 3A).

MMAO—P is modified methylalumoxane, 7 weight % in isopentane, available from Akzo Corporation (type 3A).

TiBA is triisobutylaluminum, 0.87 mol/L (20 wt % in hexane).

Preparation of diphenylmethylene(cyclopentadienyl)-(fluorenyl)zirconium dichloride (DPZ)

Synthesis of diphenylmethylene(cyclopentadienyl) (fluorenyl)zirconium dichloride, a bridged metallocene useful as a metallocene catalyst, was carried out as follows.

A solution of n-butyllithium in hexane (75 ml, 187.5 mmol) was added dropwise under nitrogen to a stirred solution of 30.45 g (183 mmol) fluorene in 225 ml THF held at ambient temperature by immersion in a cold water bath. The resulting deep red mixture was stirred for 1.5 hours.

A solution of 42.76 g (186 mmol) diphenylfulvene in 200 ml THF was added to this fluorenyl anion solution via an addition funnel. The mixture was stirred for 40 hr at room temperature.

The reaction mixture was quenched by careful addition of 300 ml saturated aqueous ammonium chloride. The organic fraction was collected, combined with ether washings of the aqueous fraction, and stripped of most of the solvent on a rotary evaporator, leaving an orange slurry. 250 ml diethyl ether were added to this slurry, the mixture was filtered, and the solid washed with additional ether. The solid was dried in vacuo overnight, yielding 31.09 g of (cyclopentadienyl)-(fluorenyl)diphenylmethane (43%).

A solution of methyllithium in diethyl ether (115 ml, 161 mmol) was added dropwise to 30.98 g (78 mmol) of the (cyclopentadienyl)(fluorenyl) diphenylmethane slurried in 500 ml THF held at 0° C. Following the addition, the solution was allowed to warm to ambient temperature. After 2 hours, most of the solvents were removed from the blood-red solution in vacuo and 400 ml hexane were stirred with the red slurry overnight. The brown solid was collected on a filter, washed with hexane and dried for 3 hours in vacuo. 38.99 g of dilithio(cyclopentadienyl)(fluorenyl) diphenylmethane bis(tetrahydrofuran) were obtained, 90%.

16.6 g (71 mmol) solid zirconium tetrachloride under argon were slowly added to a slurry of 38.99 g (71 mmol) of dilithio(cyclopentadienyl) (fluorenyl)diphenylmethane bis(tetrahydrofuran) (71 mmol) in 250 ml hexane. The slurry was stirred at room temperature overnight. The resulting slurry was centrifuged to settle the solids. The supernatant was removed by cannula and discarded, while the solid residues were slurried in hexane and centrifuged. The supernatant was again removed by cannula and discarded, while the solid residues were dried in vacuo for 3.25 h. The result was a mixture of diphenylmethylene(cyclopentadienyl) (fluorenyl)zirconium dichloride and lithium chloride, 45.57 g (100%).

Preparation of Spray Dried, Filled Catalyst Composition

Spray dried, filled catalyst compositions of the invention (Examples A to H) were prepared as follows. Ingredients and amounts are shown in Table 1.

For each catalyst composition, the filler and cocatalyst were mixed together for at least one hour at room temperature. Then DPZ (the metallocene catalyst) was added in Diluent 1, followed by Diluent 2 if necessary. In Catalyst Compositions F and G Irgafos® 168 was added as a binder and stabilizer. The resulting mixture was stirred for about 20 minutes, then sprayed through a spray dry apparatus as shown in FIG. 1.

Referring to FIG. 1, each mixture was drawn through silicone tubing from a reservoir attached at point C by a peristaltic pump D. As the mixture passed through nozzle F it was mixed with atomizing nitrogen gas, which entered the system at point E. The mist of catalyst composition thus formed in the drying chamber G then dried in the presence of bath nitrogen gas, which entered the drying chamber at point A, heated by heater B before entering. Particles of unacceptably large diameter catalyst composition were not entrained in the nitrogen flow and dropped into oversize collection pot H. The remainder of the catalyst composition continued through chamber outlet I into the cyclone separator J, where the particulate catalyst composition was disengaged from the gas stream and dropped into a removable product collection pot K, from which the fully activated catalyst composition was recovered. The nitrogen gas was drawn through the aspirator L and removed from the system at point M.

In each case, the nozzle temperature was at or above the boiling point of the highest boiling component of the mixture.

The resultant catalyst composition Al and Zr loadings are shown in Table 1.

Preparation of Silica-Supported DPZ Catalyst Composition

A comparative sample of a supported catalyst composition was prepared as follows. This catalyst is referred to as G-7 in Table 3.

A stirred glass autoclave was charged first with 3,900 mL of MAO, followed by 596 g of Davidson® 955 silica (calcined at 600° C.). The resulting slurry was stirred at 30° C. for 2 h. A solution of 20 g of DPZ (31 mmol) in 480 mL of toluene was introduced into the reactor, causing the color of the mixture to turn to deep purple. The catalyst mixture was stirred at ambient temperature for 16 h. The solvent was removed under vacuum with heating of the reactor jacket to maintain a material temperature of 72° C. until the solid was free-flowing, and at a temperature of 60° C. until the material was dry. The sample was discharged through a valve at the bottom of the reactor and found to weigh 1258 g.

A 40.0 g amount of the above material was placed under vacuum in a flask and held in an oil bath at 60° C. for 2 h to dry further. From this sample was obtained 26.7 g of pink free-flowing solid with Zr and Al loadings of $3.39 \times 10^{-5}$ and $5.2 \times 10^{-3}$ mol $g^{-1}$, respectively, as determined by ICP. A mixture of 20.2 g of this solid in 80.5 g of mineral oil was prepared for use in the gas-phase reactor.

Slurry Polymerization Trials

The spray dried, filled catalyst compositions of the invention were used to polymerize ethylene in a 1-liter stirred steel autoclave slurry reactor charged with 500 mL of hexane, 20 mL of 1-hexene, 0.5 L of hydrogen, and brought to a total pressure of 1.03 MPa with ethylene (Examples SL-1 to SL-16). Reaction time was one half hour. Materials, amounts and conditions are given in Table 2 below. The reaction temperature for each example was 80° C., except for Example SL-14, which was run at 85° C.

For each polymerization trial, the spray dried, filled catalyst composition was either used directly or mixed with the amount of Kaydol® shown in Table 2 to form a catalyst composition slurry. The catalyst composition or catalyst composition slurry was then mixed with an aluminum alkyl external cocatalyst in 50 mL of hexane as shown in Table 2. This was fed to the polymerization reactor.

The reaction was terminated by venting the reactor and adding the reaction mixture to a mixture of isopropanol and methanol to precipitate the polyethylene. The polyethylene was collected on filter paper and dried in a vacuum oven overnight at about 40° C.

The results in Table 2 show that the spray dried, filled catalyst composition has good catalytic activity for producing polyethylene in a slurry reactor. In each of the runs made in the slurry reactor, the spray dried, filled catalyst composition maintained good particle integrity and morphology during polymerization.

As a comparison, an unsupported catalyst was also used to polymerize ethylene under the same conditions in the slurry reactor (Example SL-17). The catalyst was a solution of $2.5 \times 10^{-3}$ moles/L of DPZ in toluene.

Gas Phase Reactor Trials

Spray dried, filled catalyst compositions (Examples G-2, G-3, G-4, G-5 and G-6), an unsupported catalyst composition (Example G-1) and a silica supported catalyst composition (Example G-7) were evaluated in polymerization trials in a horizontally mixed two-phase (gas/solid) stirred bed reactor in which multiple "plows" were mounted horizontally on a central shaft rotating at 190 rpm to keep particles in the reactor mechanically fluidized. Materials, amounts and conditions for each run are given in Table 3. Gas was continually recirculated through the apparatus. The reaction times were typically in the range of 4 to 12 hours.

Monomers and hydrogen (for molecular weight control) were fed to the reactor as required to maintain gas composition. The metallocene catalyst was metered into the reactor mixed with a continuous stream of cocatalyst solution. The mixed solution feed was sprayed into the reactor by a constant flow of nitrogen. Cocatalyst feed rate was maintained in proportion to the catalyst feed rate.

Specifically, the slurry catalyst feeder consisted of a 33 ml agitated feed catalyst reservoir connected to a plunger-type metering pump. The reservoir was maintained at a pressure 10 psi below reactor pressure by a high purity nitrogen blanket. The metering pump displaced 100 μl on each stroke, and the catalyst feed rate was controlled by varying the stroke frequency generally in the range of 0.5 to 10 strokes per minute. Catalyst was injected into a stream of solvent or aluminum alkyl solution for transport to the reactor through a ⅛" o.d. stainless steel tube. A metered flow of high purity nitrogen was also added to the injection tube to prevent diffusion of monomers back into the tube.

The following conditions obtained in the reactor, except where Table 3 differs:

a) total reactor pressure, 2.41 MPa;

b) partial pressure of monomer, 1.65 MPa;

c) ratio of hydrogen to ethylene monomer, 0.013;

d) molar ratio of 1-hexene to ethylene, 0.0043 in the gas phase;

e) reactor temperature, 85° C.

Nitrogen made up the balance of the gas composition.

At the end of each run, the reactor was vented, monomers were purged from the resin with nitrogen, and the batch was discharged through a valve to the open atmosphere.

The spray dried, filled catalyst compositions had activities comparable to both solution and silica-supported formulations. While the form of the spray dried, filled catalyst composition was very different from both the solution and silica-supported catalyst compositions, the characteristics of the polymer product, such as comonomer response (as indicated by the densities), retained the desirable features of metallocene-catalyzed polyethylene.

The data of Table 3 also shows that the spray dried, filled catalyst composition can be conveyed directly into a fluidized bed reactor (see Example G-3, in which no diluent was used for the catalyst composition) or admitted as a slurry in mineral oil. Again, the spray dried, filled catalyst compositions advantageously maintained their shape during polymerization.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Preparation of Spray Dried, Filled Catalyst Compositions

| Catalyst Composition | A | B | C | D | E | F | G | H |
|---|---|---|---|---|---|---|---|---|
| DPZ, g | 1.0 | 1.0 | 1.0 | 1.1 | 2.0 | 0.5 | 2.2 | 0.2 |
| Cocatalyst | MMAO-H | MAO | MAO | MMAO-H | MMAO-H | MAO | MAO | MMAOP |
| Cocatalyst, g | 200 | 200 | 98 | 101 | 210 | 204 | 860 | 50 |
| Filler, g | 23.5 | 19 | 23 | 23 | 33 | 12 | 51 | 5.5 |
| Stabilizer, g | 0 | 0 | 0 | 0 | 0 | 21 | 86 | 0 |
| Diluent 1 | toluene | toluene | toluene | toluene | toluene | toluene | toluene | isopentane |
| Diluent 1, mL | 150 | 200 | 230 | 125 | 200 | 150 | 680 | 80 |
| Diluent 2 | — | — | heptane | — | heptane | — | — | — |
| Diluent 2, mL | — | — | 80 | — | 100 | — | — | — |
| Al, wt % | 24.3 | 22.3 | 23.8 | 19.2 | 19.2 | 25.4 | 20.9 | 25.6 |
| Zr, wt % | 0.26 | 0.24 | 0.48 | 0.29 | 0.35 | 0.13 | 0.14 | 0.12 |

TABLE 2

Slurry Polymerization Trials

| Example | SL-1 | SL-2 | SL-3 | SL-4 | SL5 | SL-6 | SL-7 | SL-8 | SL-9 |
|---|---|---|---|---|---|---|---|---|---|
| Catalyst Composition | A | A | A | B | B | B | C | C | D |
| Solid Catalyst Composition, g | 0.050 | 0.113 | 0.045 | 0.254 | 0.254 | 0.257 | 0.253 | 0.253 | 0.257 |
| Kaydol ®, mL | 0 | 3 | 0 | 5 | 5 | 5 | 5 | 5 | 5 |
| Catalyst Composition Slurry, mL | — | 1.5 | — | 1 | 1 | 1 | 1 | 1 | 1 |
| External Cocatalyst | MMAO | MMAO | TiBA | MAO | TiBA | — | MAO | TiBA | TiBA |
| External Cocatalyst, mL | 1 | 1 | 1 | 1 | 1 | 0 | 1 | 1 | 1 |
| Polymer, g | 35.4 | 32.4 | 24.9 | 19.6 | 29 | 2.4 | 21.1 | 22.3 | 26 |

TABLE 2-continued

Slurry Polymerization Trials

| MI | 0.31 | 0.35 | 0.47 | — | 0.67 | — | — | — | 0.51 |
|---|---|---|---|---|---|---|---|---|---|
| FI | 10.7 | 8.4 | 10.2 | 3.4 | 9.4 | — | — | — | 10.1 |
| Activity | 70 | 65 | 57 | 38 | 57 | 4 | 20 | 23 | 32 |

| Example | SL-10 | SL-11 | SL-12 | SL-13 | SL-14[a] | SL-15 | SL-16 | SL-17 |
|---|---|---|---|---|---|---|---|---|
| Catalyst Composition | D | E | F | F | G | H | H | A solution of DPZ[b] |
| Solid Catalyst Composition, g | 0.257 | 0.256 | 0.256 | 0.255 | 0.102 | 0.150 | 0.153 | — |
| Kaydol®, mL | 5 | 5 | 5 | 5 | 0 | 5 | 5 | — |
| Catalyst Composition Slurry, mL | 1 | 1 | 2 | 2 | — | 2 | 2.5 | — |
| External Cocatalyst | MAO | TiBA | TiBA | MMAO | MMAO | MMAO | TiBA | MAO |
| External Cocatalyst, mL | 1 | 1 | 1 | 1 | 2 | 1 | 1 | 1 |
| Polymer, g | 23.2 | 29.8 | 9.6 | 28.7 | 16.8 | 13.9 | 15.6 | 43.9 |
| MI | — | 0.44 | — | — | — | — | 0.61 | 0.9 |
| FI | 5.6 | 9.7 | — | 6 | — | 6.9 | 10.8 | 24 |
| Activity | 29 | 33 | 15 | 44 | 51 | 36 | 32 | 33 |

Footnotes for Table 2:
[a] Reaction Temperature 85° C.
[b] 1 mL of $2.5 \times 10^{-3}$ mol/L DPZ in toluene

TABLE 3

Gas Phase Polymerization Trials

| Example | G-1 | G-2 | G-3 | G-4 | G-5 | G-6 | G-7 |
|---|---|---|---|---|---|---|---|
| Catalyst Composition | A solution of DPZ | B | B | E | E | F | DPZ supported on silica |
| Catalyst Composition Concentration | 0.007 mol/L | 26 wt % | 100 wt % | 25 wt % | 25 wt % | 25 wt % | 20 wt % |
| Diluent | DCM | Kaydol® | none | Kaydol® | Kaydol® | Kaydol® | Kaydol® |
| Feed Rate of Diluent, mL/h | 31 | 31 | — | 36 | 31 | 31 | 31 |
| Tot. Cat., mmol Zr | 0.18 | 0.21 | 0.17 | 0.78 | 0.78 | 0.19 | 0.68 |
| External Cocatalyst | MMAO-P | MMAO-P | MMAO-P | TiBA[a] | MMAO-P | MMAO-P | TiBA[a] |
| External Cocatalyst Feed Rate, mL/h | 110 | 110 | 50 | 150 | 150 | 110 | 72 |
| Total Pressure, MPa | 2.41 | 2.41 | 2.41 | 2.41 | 2.41 | 2.41 | 2.07 |
| $C_2H_4$ PP, MPa | 1.65 | 1.65 | 1.65 | 1.65 | 1.65 | 1.65 | 0.83 |
| Rxn Time, h | 6.1 | 6.1 | 7.9 | 9.1 | 7.0 | 7.0 | 5.7 |
| Total Resin, kg | 12.2 | 7.3 | 7.6 | 11.3 | 11.6 | 4.4 | 5.8 |
| MI | — | 0.58 | 0.23 | 0.29 | 0.15 | 0.27 | 2.9 |
| FI | — | 28 | 14 | 51 | 50 | 33 | 101 |
| Bulk Density, g/mL | 0.34 | 0.31 | 0.20 | 0.31 | 0.29 | 0.37 | 0.29 |
| Average Particle Size of Finished Polymer, mm | 1.42 | 1.02 | 1.47 | 1.42 | 1.42 | 0.79 | 0.69 |
| Density, g/mL | 0.928 | 0.921 | 0.917 | 0.923 | 0.923 | 0.925 | 0.910 |
| Activity | 6.0 | 2.8 | 2.8 | 0.8 | 1.1 | 1.4 | 1.4 |

[a] TiBA: triisobutylaluminum, 20 wt % in isopentane.

We claim:

1. A process for producing ethylene homopolymers or copolymers, comprising the steps of:
    contacting ethylene and optionally a higher alpha-olefin monomer under polymerization conditions with a spray dried catalyst composition comprising solid particles, each particle comprising a mixture of: a) a metallocene catalyst; b) a cocatalyst capable of activating said metallocene catalyst; and c) a particulate filler material having an average particle size of 0.0011–0.1 micrometers that is unreactive with the metallocene catalyst and the cocatalyst, wherein the average particle size of the catalyst composition is 5 to 500 micrometers.

2. The process of claim 1, wherein ethylene and a higher alpha-olefin monomer having 3 to 8 carbon atoms are contacted with the catalyst composition.

* * * * *